(12) United States Patent
Merchant

(10) Patent No.: US 11,867,547 B2
(45) Date of Patent: Jan. 9, 2024

(54) MEASURING AIR RESTRICTION IN A VEHICLE

(71) Applicant: International Engine Intellectual Property Company, LLC, Lisle, IL (US)

(72) Inventor: Fozia Mohammedali Merchant, Schaumburg, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 37 days.

(21) Appl. No.: 17/838,815

(22) Filed: Jun. 13, 2022

(65) Prior Publication Data

US 2023/0400340 A1 Dec. 14, 2023

(51) Int. Cl.
*G01F 15/063* (2022.01)
*G01N 15/08* (2006.01)
*G01F 1/56* (2006.01)

(52) U.S. Cl.
CPC .............. *G01F 15/063* (2013.01); *G01F 1/56* (2013.01); *G01N 15/08* (2013.01); *G01N 2015/084* (2013.01)

(58) Field of Classification Search
CPC ......... G01F 15/063; G01F 1/56; G01N 15/08; G01N 2015/084

USPC ........................................................ 73/861.08
See application file for complete search history.

(56) References Cited

U.S. PATENT DOCUMENTS

| | | | |
|---|---|---|---|
| 6,172,602 B1* | 1/2001 | Hasfjord | G07C 5/085 701/29.5 |
| 6,307,466 B1* | 10/2001 | Ferris | B01D 46/0095 116/DIG. 25 |
| 7,168,304 B2 | 1/2007 | Beaucaire et al. | |
| 2003/0060949 A1* | 3/2003 | Letang | F02D 41/221 701/34.4 |
| 2014/0350774 A1* | 11/2014 | Mouzakitis | G01R 31/007 701/29.1 |

FOREIGN PATENT DOCUMENTS

WO    WO-2015149078 A1 * 10/2015 ............. A01C 7/081

* cited by examiner

*Primary Examiner* — Nathaniel T Woodward
(74) *Attorney, Agent, or Firm* — Mark C. Bach

(57) ABSTRACT

Systems and methods for measuring air restriction in a vehicle are provided. In some aspects, a method includes providing an electrically operable, air restriction device configured to measure an air restriction in at least a portion of a vehicle's air system, and operating the electrically operable, air restriction device using power provided by a power system on the vehicle. The method also includes controlling power to the electrically operable, air restriction device using a hood switch that is connected to the power system.

15 Claims, 5 Drawing Sheets

MEASURING AIR RESTRICTION IN A VEHICLE

FIELD

The present disclosure generally relates to engine components and operations. More particularly, embodiments described relate to systems and methods for measuring air restriction in a vehicle.

BACKGROUND

Air filters protect the engine by capturing debris present in the air. However, as filters accumulate dust and debris present in the air, air intake quality is compromised, and air flow becomes restricted. Restricted air flow can reduce vehicle efficiency and increase gas consumption. In some situations, air filters can become so dirty that the filters can no longer allow sufficient air for normal engine operation, in a condition known as "terminal restriction." If dirty or clogged air filters are not timely changed, a considerable amount of progressive damage can occur, which can lead to catastrophic turbo failure along with expensive vehicle repairs and unplanned downtime.

Besides visually inspecting vehicle components, fleets and OEM suppliers often rely on various sensors and devices in the course of vehicle servicing and maintenance. For instance, air restriction gauges or indicators are commonly used to determine when to replace air intake filters in order to maintain fuel economy, engine performance, as well as proper engine exhaust temperature. These gauges operate mechanically by using compression springs. Specifically, the gauges include a spring-loaded diaphragm that separates a low-pressure region and a high-pressure region. As the pressure differential between the two regions changes (e.g. because of a change in air filter condition), the diaphragm expands and provides a warning signal to a servicing user via graduated markings, for example. However, such mechanically operable devices are cumbersome to read due to their location on the vehicle (i.e. under the hood), and can be fairly inaccurate due to the spring-loaded mechanical design.

More modern sensor designs rely on power from the vehicle. For instance, some sensors indicate air restriction via color or color changes displayed using light emitting diodes (LEDs), for example. However, such electrical-based air restriction devices are typically powered using the vehicle's battery when ignition power is active. This presents a risk for prematurely discharging the battery, particularly during extensive vehicle servicing and preventative maintenance. Therefore, there is a need for improved approaches to measuring air restriction and operating electrically operable, air restriction devices that rely on electrical power.

SUMMARY

The present disclosure overcomes the aforementioned drawbacks by providing a novel approach to measuring air restriction.

In accordance with one aspect of the disclosure, a system for measuring air restriction in a vehicle. The system includes at least one electrically operable, air restriction device configured to measure an air restriction in at least one portion of a vehicle's air system and a power system configured to provide power to the electrically operable, air restriction device. The system also includes a hood switch that is connected to the power system and configured to control the power received by the electrically operable, air restriction device.

In accordance with another aspect of the disclosure, a method for measuring air restriction is provided. The method includes providing an electrically operable, air restriction device configured to measure an air restriction in at least a portion of a vehicle's air system and operating the electrically operable, air restriction device using power provided by a power system on the vehicle. The method also includes controlling power to the electrically operable, air restriction device using a hood switch that is connected to the power system.

BRIEF DESCRIPTION OF THE DRAWINGS

The present disclosure describes various embodiments with reference to the accompanying figures, wherein like reference numerals denote like elements. Such embodiments are illustrated by way of example, and not by way of limitation.

DETAILED DESCRIPTION

Good engine performance and fuel economy relies on regular vehicle servicing and maintenance, which often includes the measurement of air flow restriction in the vehicle's air system. In particular, air flow restriction measurements may indicate the status or functionality of engine component, such as the condition of the engine's air filter. Modern air flow restriction sensors or devices typically operate electrically using power from the vehicle. For instance, LED-based air restriction indicators installed on a vehicle's intake can show air flow restriction across the engine air filter by using color. For example, when a new air filter is installed, the LED illuminates with a green color when powered as active. As the air filter builds up contaminant, the LED changes color to an amber-yellow color when powered as active. Finally, at end of filter's life cycle (i.e. when the air filter has reached the "terminal restriction" stage), the LED illuminates with a red color when powered as active, and thereby signals the operators/service technician that it is time to change the dirty/clogged air filter.

Yet, such modern air flow restriction sensors or devices can only be powered by the ignition grid of the vehicle. That is, active ignition power would be needed in order to provide the air restriction measurement. This further means that such air flow restriction sensors or devices cannot be connected to the vehicle's battery. This is because, depending on the duration and complexity of the vehicle service, there would be the risk of premature battery drainage when the vehicle is powered off. The present disclosure provides a technical solution that overcomes this drawback and solves this technical problem, as appreciated from the description below.

Figure 1:
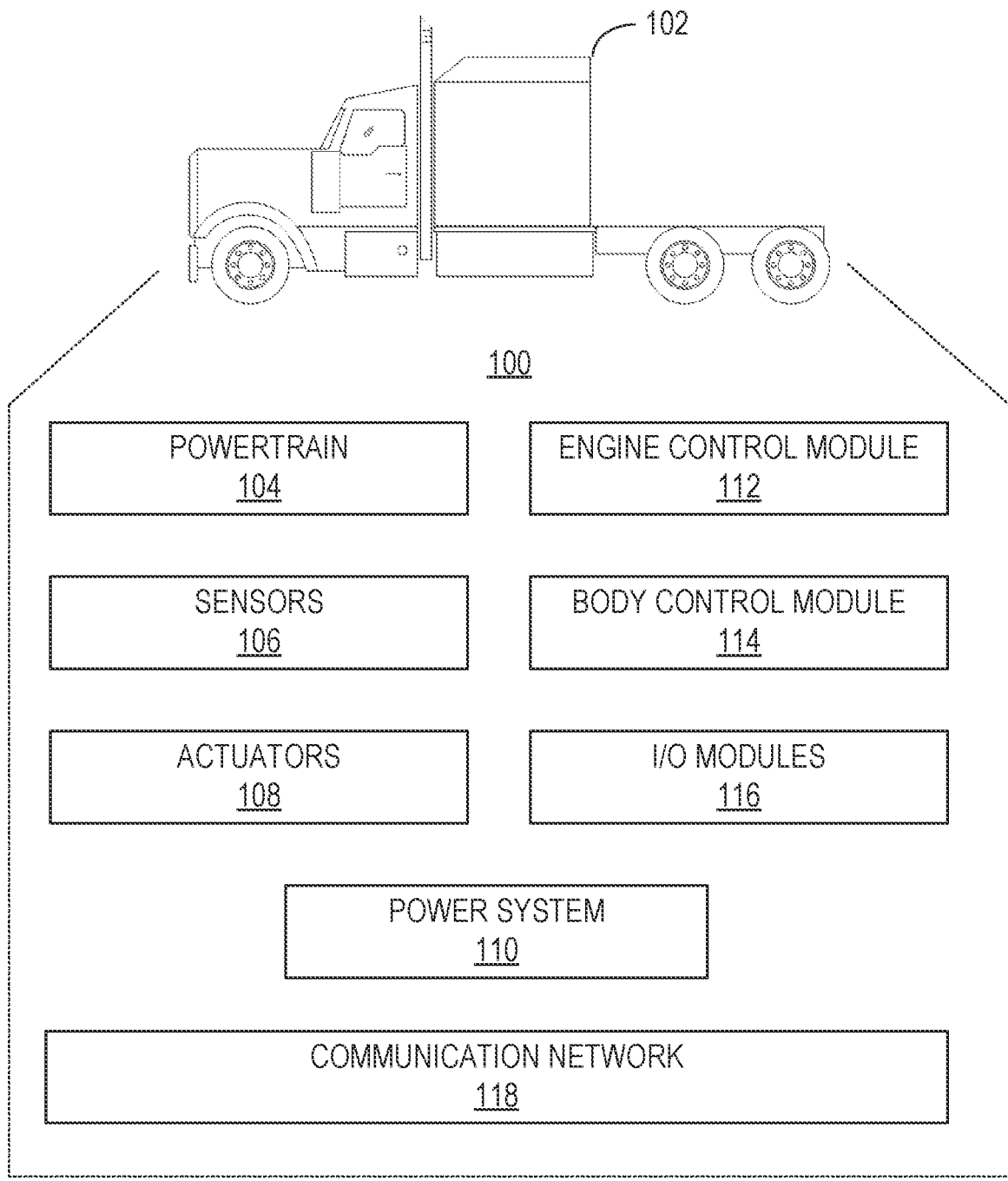
FIG. 1 is schematic diagram showing an example system, in accordance with aspects of the present disclosure.

FIG. 1 illustrates an example system 100 in accordance with aspects of the present disclosure. The system 100 may be part of or incorporated into a vehicle 102. The vehicle 102 may include various types of automobiles, such as trucks, semis, crossover utility vehicles (CUVs), sport utility vehicles (SUVs), recreational vehicles (RVs), as well as boats, planes, drones, trains, and other machines for transporting goods and/or people.

In general, the system 100 may include a vehicle powertrain 104, sensors 106, actuators 108, and a power system 110. The powertrain 104 may include a variety of components, including an engine, transmission, driveshaft, axle, differential and so forth, that together create power and deliver it to the wheels of the vehicle 102 to propel it. In some applications, the vehicle 102 is powered by an internal combustion engine. In other applications, the vehicle 102 is powered by electric power provided by one or more electric motors. In yet other applications, the vehicle 102 is powered by a combination of electric and combustion power.

The sensors 104 of the system 100 may include a variety of sensors, including sensing devices, configured to provide various useful signals and information about the vehicle 102 operation. By way of non-limiting example, the sensors 104 may include mass airflow sensors, voltage sensors, fuel sensors, temperature sensors, airflow sensors, oxygen sensors, coolant sensors, sparkplug sensors, coolant sensors, throttle sensors, speed sensors, cameras, and so forth. In one embodiment, the system 100 also includes at least one electrically operable, air restriction device, such as a light emitting diode (LED) electrically operable, air restriction device, that is configured to receive power from the power system 110, and measure air restriction on the vehicle 102.

The actuators 108 of the system 100 may perform a multitude of tasks on the vehicle 102, including regulating fluid flow, moving components, controlling valves, activating switches, operating gears, and so forth, by way of hydraulic, pneumatic, magnetic or electrical activation or movement of components.

The power system 110 may include a variety of hardware and components, including one or more batteries, solar panels, starters, alternators, relays, converters, controllers, regulators, switches, solenoids, electrical wiring, electrical circuitry, electrical elements, and so forth. In some embodiments, the power system 110 provides power to sensors on the vehicle 102, including electrically operable, air restriction devices on the vehicle 102.

Referring again to FIG. 1, the system 100 may also include a number of control modules that are configured to perform, manage and monitor various functions of the vehicle 102. In some embodiments, the system 100 may include an engine control module 112, and a body control module 114. Although specific examples of control modules are shown in FIG. 1 as being included in the system 100, the system 100 may include more or fewer control modules, integrating or separating different functionalities of monitoring or control of components on the vehicle. For instance, in some embodiments, the system 100 may include modules for brake control, climate control, transmission control, and so on.

The engine control module (ECM) 112 may be configured to control various parameters and functions of the vehicle's engine, including the air-fuel ratio, idle speed, valve timing, ignition timing, crankshaft position, and so forth. To this end, the ECM 112 may include any combination of analog and/or digital inputs and outputs, microprocessors, integrated circuitry, memories, clocks, Application Programming Interfaces (APIs), firmware, software, and so forth, and may be configured to communicate with various sensors 106, actuators 108, and other components on the vehicle 102.

The body control module (BCM) 114 may be configured to monitor and control various vehicle body, security and convenience functions. For instance, the BCM 114 may be configured to manage exterior lighting, interior lighting, car locking, remote entry, remote start, windshield wipers, seat adjustment, tire pressure monitoring, and so forth. To this end, the BCM 114 may include any combination of analog and/or digital inputs and outputs, microprocessors, integrated circuitry, programmable circuitry, clocks, APIs, and so forth, and may be configured to communicate with, monitor and control various sensors 106, actuators 108, and other components on the vehicle 102. In some implementations, the BCM 114 may include a memory or a non-transitory computer-readable storage medium configured for storing and retrieving data, information, and executable instructions. The BCM 114 may include a variety of other elements, including various electrical circuitry and components. Such elements may be contained inside one or more housing or assemblies. The BCM 114 can operate either independently via programming that hardwired or externally programmed, but may also cooperate with various external computers, systems, or devices.

In some embodiments, the BCM 114 may be configured to monitor air flow restriction using sensors, including sensing devices, installed on the vehicle 102. To do so, the BCM 114 may receive various input signals and provide various output signals via inputs/outputs configured therein. The signals may be of any form, duration, or type. In one embodiment, the BCM 114 includes at least one switch input and at least one sensor or device output. The switch input may be configured to be wakeable or activated when the vehicle state is off as a result of a specific action associated with the vehicle, such as the hood of a vehicle being raised. In some implementations, the BCM 114 may be configured to receive a status signal from a switch (e.g. a hood switch) connected to a switch input, and based on the status signal, provide an output signal to a sensor or device (e.g. electrically operable, air restriction device) connected to a sensor or device output. The intensity and timing of the output signal may vary depending on the specifications of the sensor or device, as well as the capabilities of the BCM 114. In some embodiments, the sensor output may be configured to provide sufficient power to operate the sensor or device. For instance, in one non-limiting example, the sensor or device output may be configured to output a supply voltage between approximately 5.0 Volts and approximately 14.0 Volts, although other voltages may be possible. In addition, the sensor or device output may be configured to be timed to turn off automatically after a predetermined countdown or timed event. By way of non-limiting example, the countdown or timed event may be approximately between 45 minutes to 3 hours, although other amounts of time can be possible depending on the operator or service needs. After the countdown or time event, the output signal may then be automatically interrupted, or be ramped down.

As shown in FIG. 1, the system 100 may also include a number of input/output (I/O) modules 116. The I/O modules 116 may include a variety of input and output elements. Example input elements include buttons, dials, knobs, touchscreens, keyboards, and so forth. Example output elements include monitors, screens, panels, displays, buzzers, speakers, and so forth. In some implementations, the I/O modules may be configured to receive instructions from a user. To this end, the user may be able to select or specify various parameters or modes of operation. In some implementations, the I/O modules 116 may include a human machine interface or dashboard.

Components of the system 100 may be coupled or connected to one another, and exchange signals, data, and information, by way of a communication network 118. The communication network 118 may include a variety of hardware and components that provide wired as well as wireless connectivity. In some embodiments, the communication network 118 includes one or more vehicle buses that interconnects components and hardware in the system 100, and implements one or more communications protocols. Non-limiting example protocols include Control Area Network (CAN), Local Interconnect Network (LIN), Flex-Ray, Vehicle Area Network (VAN), Media Oriented System Transport (MOST), Ethernet, and so forth. The communications network 118 may also include gateways, bridges, receivers, transmitters, transceivers, and other components and hardware facilitating communication.

Figure 2:
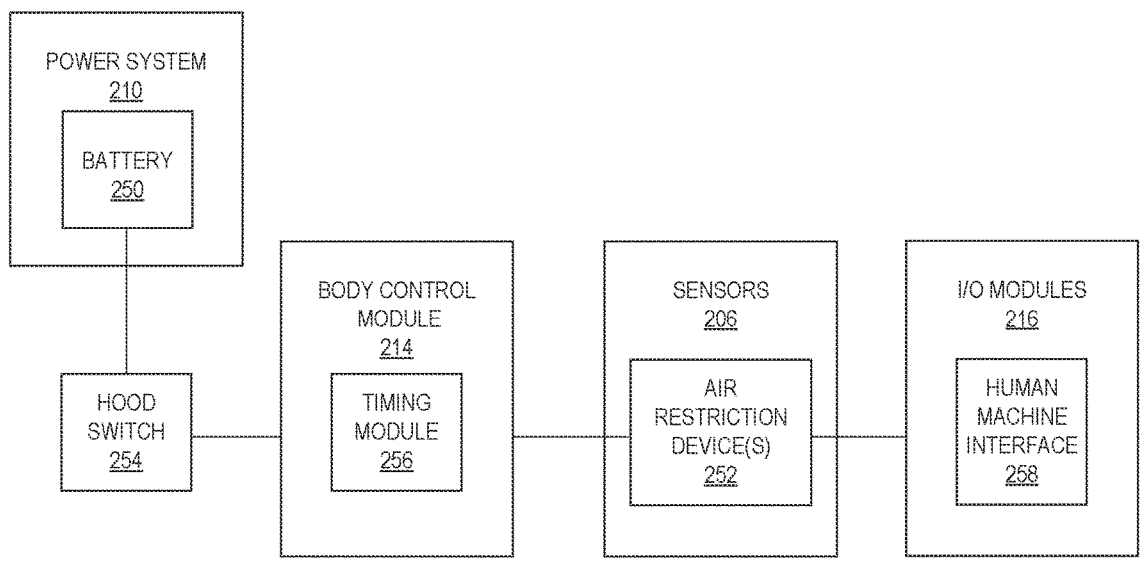
FIG. 2 is schematic diagram showing another example system, in accordance with aspects of the present disclosure.

Turning now to FIG. 2, an example system 200, in accordance with aspects of the present disclosure, is illustrated. In general, the system 200 may include one or more sensors 206, including sensing devices, a power system 210, BCM 214, and one or more I/O modules 216. In some embodiments, the power system 210 includes at least one battery 250, and the sensors 206 include at least one electrically operable, air restriction device 252. The electrically operable, air restriction device 252 may be configured to measure and indicate air restriction in at least one portion of a vehicle's air system. For example, the electrically operable, air restriction device 252 may be installed in or about an engine's air cleaner housing or near an air filter. In some embodiments the electrically operable, air restriction device 252 may include an LED-based air restriction sensor or device, such as the Cummins FLEET guard-LED Air Restriction Sensor, although other types may be possible. In this non-limiting example, the electrically operable, air restriction device's 252 LED(s) may indicate the filter's remaining life by emitting one or more colors.

As shown in the figure, the battery 250 may be connected to a hood switch 254, which in turn may be connected to the BCM 214. In particular, on output on the BCM 214 may be connected to at least one electrical lead of the electrically operable, air restriction device 252, as well as to other sensors. In some embodiments, the hood switch 254 may be configured to provide a status signal representing the position of the hood of the vehicle 102. For instance, when the vehicle's 102 hood is raised, the hood switch 254 is in a first position (e.g. CLOSED), and provides a first status signal to the BCM 214. When the hood is lowered or closed, the hood switch 254 is in a second position (e.g. OPEN), and provides a second status signal BCM 214. The BCM 214 may then activate or deactivate the electrically operable, air restriction device 252 by providing power thereto, or cutting off power, based upon the status signal received from the hood switch 254.

In some embodiments, the hood switch 254 may also be configured to control the power received by BCM 214 from the power system 210. For example, when the hood switch 254 is in the first position (e.g. CLOSED), power can flow from the battery 250 to the BCM 214. Conversely, when the hood switch 254 is in the second position (e.g. OPEN), no power is received by the BCM 214. In some embodiments, the BCM 214 may include a timing module 256, as shown in FIG. 2. The timing module 256 may include an internal clock or timer, as well as other circuitry and components. The activation or readout of the timing module 256 may occur under specific conditions or events. For instance, in some implementations, upon receipt of a predetermined status signal from the hood switch 254, the timing module 256 may be configured to activate a predetermined or programmable countdown, during which time the BCM 214 provides an output signal to, or powers, the electrically operable, air restriction device 252. In some non-limiting examples, the countdown may be between approximately 45 minutes and 3 hours, although other countdown values may be possible, depending on the nature of service or maintenance being performed on the vehicle 102. After the countdown has elapsed, the BCM 214 ceases to provide the output signal or provide power the electrically operable, air restriction device 252. As such, the timing module 256 limits the amount of time that the electrically operable, air restriction device 252 is active, the BCM 214 is active, and/or the power is being drawn from the battery 250.

As shown in FIG. 2, the electrically operable, air restriction device 252 may also be connected to a human machine interface (HMI) 258. The HMI 258 may be configured to receive an output from, or read out from, the electrically operable, air restriction device 252, either continuously or intermittently. For instance, the HMI 258 may receive or read out a visual signal (e.g. a color or a change in color of an LED) that informs the user about the level of air restriction detected by the electrically operable, air restriction device 252. Alternatively, the HMI 258 may also receive or read out an electric or electronic signal from the electrically operable, air restriction device 252. In some embodiments, the HMI 258 may provide a report (e.g. in the form of an audible signal, an indication on a display, etc.) to a servicing user that indicates an air restriction in the vehicle's air system.

Connectivity between the components shown in FIG. 2 may be achieved using a variety of electrical and optical connectors, wires, leads, harnesses, etc. In some implementations additional connections to, or couplings between the components shown in FIG. 2 (not shown) may be possible, such as grounding connections, wires or straps, as well as connections to other components or elements.

Figure 3:
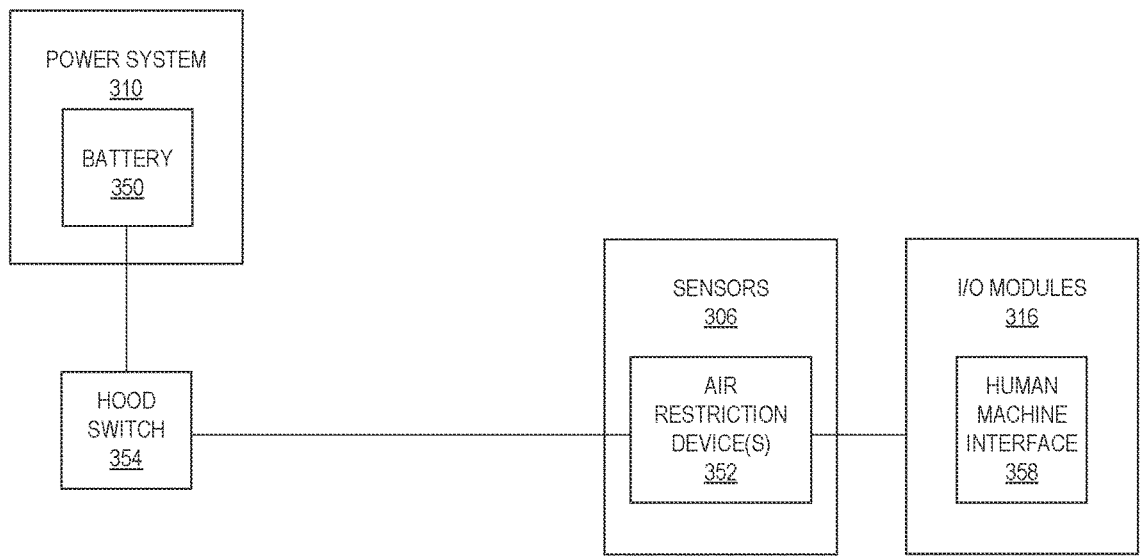
FIG. 3 is schematic diagram showing yet another example system, in accordance with aspects of the present disclosure.

In some embodiments, operation of sensors on the vehicle 102 may be controlled directly by a switch. Referring specifically to FIG. 3, an example system 300, in accordance with aspects of the present disclosure, is illustrated. In general, the system 300 may include one or more sensors 306, including sensing devices, a power system 310, and one or more I/O modules 316. In some embodiments, the power system 310 includes at least one battery 350 and the sensors 306 include at least one electrically operable, air restriction device 352. The system 300 also includes a hood switch 354.

As shown in the figure, the battery 350 may be connected to a hood switch 354, which in turn is connected to the electrically operable, air restriction device 352. In some embodiments, at least one electrical lead of the electrically operable, air restriction device's 352 is connected to the hood switch 354. The hood switch 354 allows for power from battery 350 to be directed to the sensors 306, and more specifically, to the electrically operable, air restriction device 352, based on the position of the hood of the vehicle 102. For instance, when the vehicle's 102 hood is raised, the hood switch 254 is in a first position (e.g. CLOSED), which allows power to flow from the battery 350 to the electrically operable, air restriction device 352. By contrast, when the hood is lowered or closed, the hood switch 354 is in a second position (e.g. OPEN), and power to the electrically operable, air restriction device 352 is interrupted. As appreciated from FIG. 3, the system 300 allows for controlling operation of the electrically operable, air restriction device 352 in accordance with maintenance and servicing performed on the vehicle 102 while the hood is raised and open.

Figure 4:
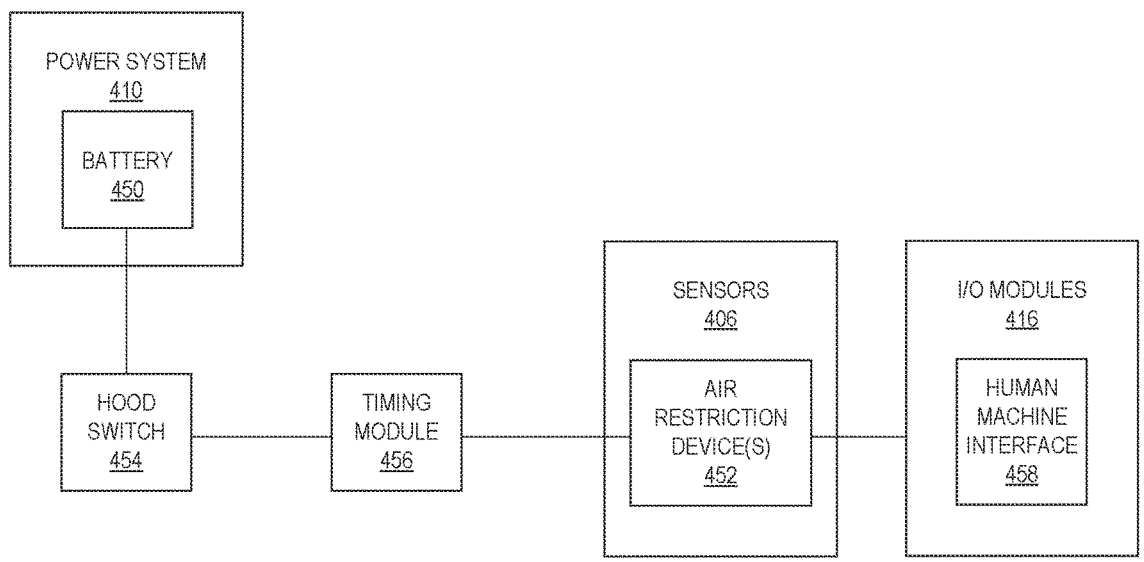
FIG. 4 is schematic diagram showing yet another example system, in accordance with aspects of the present disclosure.

In some applications, the maintenance and servicing of a vehicle 102 with the hood raised may last for extended periods of time. To limit the amount of power being drawn from the vehicle's battery, a timed relay or switch logic circuitry may be utilized. Referring specifically to FIG. 4, an example system 400, in accordance with aspects of the present disclosure, is illustrated. The system 400 may include one or more sensors 406, a power system 410, and one or more I/O modules 416. In some embodiments, the power system 410 includes at least one battery 450, and the sensors 406 include at least one electrically operable, air restriction device 452.

The system 400 also includes a hood switch 354 and a timing module 456. As shown in the figure, the battery 450, hood switch 454, timing module 456 and electrically operable, air restriction device 352 are connected in sequence. The hood switch 454 allows for power to be directed to the sensors 406, and more specifically to the electrically operable, air restriction devices 452, based on the position of the hood of the vehicle 402, as described. The timing module 456 may be configured to control the duration of power being provided to the sensors 406. That is, the timing module 456 limits the amount of time that the electrically operable, air restriction device 452 is active and draws power from the battery 450. As such, the timing module 456 may include a variety of electric or electronic components and hardware, including timed-based relays, switch logic circuitry, and so forth.

Figure 5:
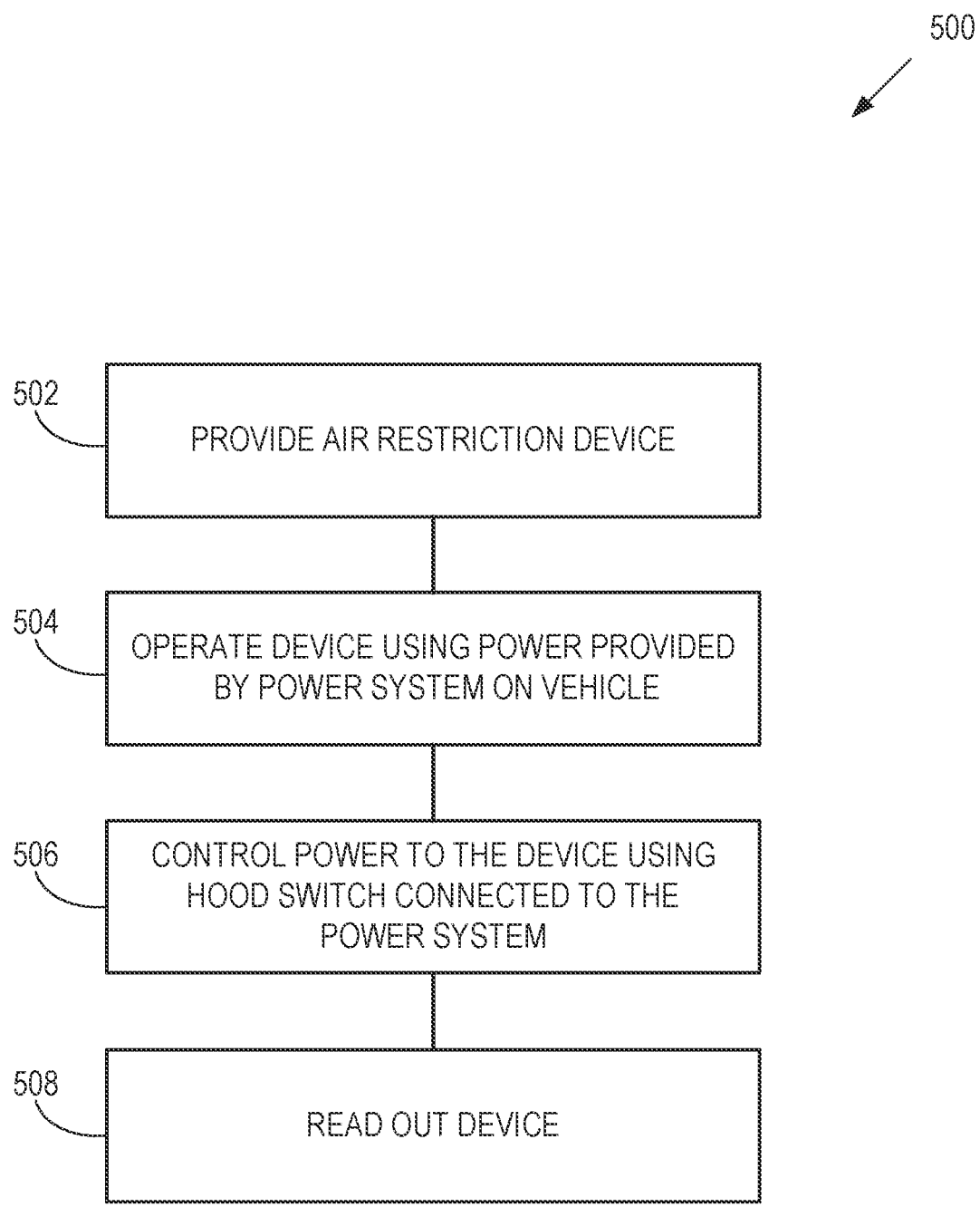
FIG. 5 is a flowchart setting forth steps of a process, in accordance with aspects of the present disclosure.

Turning now to FIG. 5, a flowchart setting forth steps of a process 500, in accordance with aspects of the present disclosure, is illustrated. Steps of the process 500 may be carried out using any combination of suitable devices or systems, as well as using systems described in the present disclosure. In some embodiments, steps of the process 500 may be implemented as instructions stored in non-transitory computer readable media, as a program, firmware or software, and executed by a general-purpose, programmed or programmable computer, processer or other computing device. In other embodiments, steps of the process 500 may be hardwired in an application-specific computer, processer, or dedicated system or module as described with reference to FIGS. 1 to 4. Although the process 500 is illustrated and described as a sequence of steps, it is contemplated that the steps may be performed in any order or combination, and need not include all of the illustrated steps.

The process 500 may begin at process block 502 with providing at least one electrically operable, air restriction device. As described, each electrically operable, air restriction device may be configured to measure air restriction in at least a portion of a vehicle's air system. In some implementations, process block 502 includes the installation, configuration and programming (if needed) of various components on the vehicle, including the electrically operable, air restriction device(s). For instance, in one implementation, process block 502 includes the step connecting at least one lead of each electrically operable, air restriction device's electrical harness to the hood switch, as shown and described with reference to FIG. 3. In another implementation, process block 502 includes the step of connecting the hood switch to a BCM, and connecting at least one lead of each electrically operable, air restriction device's electrical harness to the BCM, as shown and described with reference to FIG. 2. In yet another implementation, process block 502 includes the step of connecting the hood switch to a timing module, and connecting at least one lead of each electrically operable, air restriction device's electrical harness to the timing module (e.g. a timed relay or switch), as shown and described with reference to FIG. 4. In other implementations, process block 502 includes providing guidance or instructions for installing and configuring the components on the vehicle.

Process block 504 may then include operating the electrically operable, air restriction device(s) using power provided by a power system on the vehicle. Power to the electrically operable, air restriction device(s) may then be controlled using a hood switch that is connected to the power system, as indicated by process block 506.

In some embodiments, power to the electrically operable, air restriction device(s) may be controlled at process block 506 by the hood switch sending a status signal to a BCM, as described with reference to FIG. 2. Based on the status signal, the BCM can provide one or more output signals to the electrically operable, air restriction device(s) using one or more sensor or device outputs on the BCM. The intensity and timing of each output signal may vary depending on the specifications of the sensor or device, as well as the capabilities of the BCM. For instance, in some embodiments, a sensor or device output of the BCM may be configured to provide sufficient power to operate an electrically operable, air restriction device. In some implementations, the duration of the output signal may be controlled by a timing module configured in the BCM.

In other embodiments, power to the electrically operable, air restriction device(s) may be controlled directly by the hood switch, as described with reference to FIGS. 3 and 4. For instance, when a vehicle's hood is raised, the hood switch is in a first position (e.g. CLOSED), which allows power to flow directly from a battery to each electrically operable, air restriction device. By contrast, when the hood is lowered or closed, the hood switch is in a second position (e.g. OPEN), and power to the electrically operable, air restriction device(s) is interrupted. In some variations, a duration of power being delivered to the electrically operable, air restriction device(s) may be controlled by a timing module configured between the hood switch and the electrically operable, air restriction device(s), as described with reference to FIG. 4.

Then, at process block 508, a measurement of the air restriction in the vehicle can be performed by reading out the electrically operable, air restriction device(s). As described, measurement may be performed by way of visual or electrical signals, or both. Signals that are read out may be analog or digital. In some implementations, a human machine interface configured to receive an output from, or read out, the electrically operable, air restriction device(s), may be used. For instance, the HMI may receive or read out a visual signal (e.g. a color or a change in color of an LED) that informs the user about the level of air restriction detected by a sensor or device. Readout at process block 508 may be continuous or intermittent, depending on the application.

Optionally, a report may also be generated and provided at process block 508. The report may be in any form, and provide various information. In some implementations, the report may be in the form of visual and/or audio signals, images, tabulated information and data, instructions, and combinations thereof. The report may be communicated to a user or operator by way of a display, HMI, speakers, or other means of output, or transmitted to various devices or systems for further steps, analysis or processing. The report may be generated and provided intermittently or continuously in substantially real-time. The report, or portions thereof, may also be electronically communicated (e.g. to a computer, server, mobile device, phone and so forth) and stored (e.g. in a memory, a computer, a database, a server, and so forth). In some implementations, the report may indicate a level of air restriction, for example, in or through a vehicle's air system or filter.

In some embodiments, the present disclosure provides a system for measuring air restriction in a vehicle comprising at least one electrically operable, air restriction device configured to measure an air restriction in at least one portion of a vehicle's air system, a power system configured to provide power to the electrically operable, air restriction device, and a hood switch that is connected to the power system and configured to control the power received by the electrically operable, air restriction device. In some embodiments, the at least one electrically operable, air restriction device is a light-emitting diode (LED) electrically operable, air restriction device. In some embodiments, the system further comprises a body control module in communication with the hood switch. In some embodiments, the hood switch is further configured to provide a status signal to the body control module representing a position of the hood of the vehicle. In some embodiments, the body control module is further configured to activate or deactivate the at least one electrically operable, air restriction device based upon the status signal received from the hood switch. In some embodiments, the hood switch is further configured to control the power received by body control module from the power system. In some embodiments, the hood switch is further connected to the at least one electrically operable, air restriction device and configured to control the power received by the at least one electrically operable, air restriction device from the power system. In some embodiments, the system further comprises a timing module configured to control a duration of power being provided to the at least one electrically operable, air restriction device. In some embodiments, the system further comprises a human machine interface configured to measure the air restriction in the at least one portion of a vehicle's air system by reading out the at least one electrically operable, air restriction device.

In some embodiments, the present disclosure provides a method for measuring air restriction in a vehicle. The method comprises providing at least one electrically operable, air restriction device configured to measure an air restriction in at least a portion of a vehicle's air system, operating the at least one electrically operable, air restriction device using power provided by a power system on the vehicle, and controlling power to the at least one electrically operable, air restriction device using a hood switch that is connected to the power system. In some embodiments, the method further comprises connecting at least one lead of the at least one electrically operable, air restriction device's electrical harness to the hood switch. In some embodiments, the method further comprises connecting at least one lead of the at least one electrically operable, air restriction device's electrical harness to a body control module that is in communication with the hood switch. In some embodiments, the method further comprises activating or deactivating the electrically operable, air restriction device by controlling power thereto based upon a status signal received from the hood switch by the body control module. In some embodiments, the method further comprises connecting at least one lead of the at least one electrically operable, air restriction device's electrical harness to a timing module that is in communication with the hood switch. In some embodiments, the method further comprises measuring air restriction in the vehicle by reading out the at least one electrically operable, air restriction device.

While the present disclosure describes number of embodiments and implementations, such embodiments and implementations are not so limited, and may cover various obvious modifications and equivalent arrangements, which fall within the purview of the appended claims. Although features are expressed in certain combinations among the claims, it is contemplated that these features can be arranged in any combination and order. It should be appreciated that many equivalents, alternatives, variations, and modifications, aside from those expressly stated, are possible.

The invention claimed is:

1. A system for measuring air restriction in a vehicle, the system comprising:
   at least one electrically operable, air restriction device configured to measure an air restriction in at least one portion of a vehicle's air system;
   a power system configured to provide power to the electrically operable, air restriction device; and
   a hood switch that is connected to the power system and configured to control the power received by the electrically operable, air restriction device.

2. The system of claim 1, wherein the at least one electrically operable, air restriction device is a light-emitting diode (LED) electrically operable, air restriction device.

3. The system of claim 1, wherein the system further comprises a body control module in communication with the hood switch.

4. The system of claim 3, wherein the hood switch is further configured to provide a status signal to the body control module representing a position of the hood of the vehicle.

5. The system of claim 4, wherein the body control module is further configured to activate or deactivate the at least one electrically operable, air restriction device based upon the status signal received from the hood switch by the body control module.

6. The system of claim 3, wherein the hood switch is further configured to control the power received by body control module from the power system.

7. The system of claim 1, wherein the hood switch is further connected to the at least one electrically operable, air restriction device and configured to control the power received by the at least one electrically operable, air restriction device from the power system.

8. The system of claim 1, wherein the system further comprises a timing module configured to control a duration of power being provided to the at least one electrically operable, air restriction device.

9. The system of claim 1, wherein the system further comprises a human machine interface configured to measure the air restriction in the at least one portion of a vehicle's air system by reading out the at least one electrically operable, air restriction device.

10. A method for measuring air restriction in a vehicle, the method comprising:
    providing at least one electrically operable, air restriction device configured to measure an air restriction in at least a portion of a vehicle's air system;
    operating the at least one electrically operable, air restriction device using power provided by a power system on the vehicle; and
    controlling power to the at least one electrically operable, air restriction device using a hood switch that is connected to the power system.

11. The method of claim 10, wherein the method further comprises connecting at least one lead of the at least one electrically operable, air restriction device's electrical harness to the hood switch.

12. The method of claim 10, wherein the method further comprises connecting at least one lead of the at least one electrically operable, air restriction device's electrical harness to a body control module that is in communication with the hood switch.

13. The method of claim 12, wherein the method further comprises activating or deactivating the electrically operable, air restriction device by controlling power thereto based upon a status signal received from the hood switch by the body control module.

14. The method of claim 10, wherein the method further comprises connecting at least one lead of the at least one electrically operable, air restriction device's electrical harness to a timing module that is in communication with the hood switch.

15. The method of claim 10, wherein the method further comprises measuring air restriction in the vehicle by reading out the at least one electrically operable, air restriction device.

* * * * *